(12) United States Patent
Borowiak, Jr. et al.

(10) Patent No.: US 11,952,463 B2
(45) Date of Patent: Apr. 9, 2024

(54) ACID NEUTRALIZING POLYMER POWDER

(71) Applicant: Workers First LLC, Pittsburgh, PA (US)

(72) Inventors: Matthew James Borowiak, Jr., Pittsburgh, PA (US); Richard Earl Partch, Hannawa Falls, NY (US)

(73) Assignees: Workers First LLC, Pittsburgh, PA (US); Clarkson University, Potsdam, NY (US)

( * ) Notice: Subject to any disclaimer, the term of this patent is extended or adjusted under 35 U.S.C. 154(b) by 120 days.

(21) Appl. No.: 17/360,111

(22) Filed: Jun. 28, 2021

(65) Prior Publication Data

US 2021/0324140 A1   Oct. 21, 2021

Related U.S. Application Data

(63) Continuation-in-part of application No. 16/376,669, filed on Apr. 5, 2019, now Pat. No. 11,078,331.

(60) Provisional application No. 63/079,186, filed on Sep. 16, 2020, provisional application No. 62/653,788, filed on Apr. 6, 2018.

(51) Int. Cl.
    *C08G 69/48*  (2006.01)
    *C08G 69/14*  (2006.01)
    *C08G 69/26*  (2006.01)

(52) U.S. Cl.
    CPC ............. *C08G 69/48* (2013.01); *C08G 69/14* (2013.01); *C08G 69/265* (2013.01)

(58) Field of Classification Search
    None
    See application file for complete search history.

(56) References Cited

U.S. PATENT DOCUMENTS

| | | |
|---|---|---|
| 3,725,503 A | 4/1973 | Kunde et al. |
| 3,966,835 A | 6/1976 | Christooph et al. |
| 4,170,682 A | 10/1979 | Beetschen et al. |
| 5,279,899 A | 1/1994 | Asrar |
| 5,346,959 A | 9/1994 | Goman et al. |
| 5,491,200 A | 2/1996 | Harris et al. |
| 6,617,267 B2 | 9/2003 | Soane et al. |
| 8,697,831 B2 | 4/2014 | Drysdale et al. |
| 9,234,059 B2 | 1/2016 | Hartmann et al. |
| 9,593,201 B2 | 3/2017 | Joy et al. |
| 9,738,756 B2 | 8/2017 | Häffner et al. |

FOREIGN PATENT DOCUMENTS

| | | |
|---|---|---|
| EP | 0555197 | 11/1993 |
| JP | 54059422 | 5/1979 |
| JP | 59144617 | 8/1984 |
| JP | 2513816 B2 * | 7/1996 |
| WO | 2008108755 | 9/2008 |

OTHER PUBLICATIONS

JP 2513816 B2 (Jul. 1996) machine translation.*
Jia, Xinqiao; et al., Nylon Surface Modification. Part 1. Targeting the Amide Groups for Selective Introduction of Reactive Functionalities, Department of Materials Science and Engineering, Jun. 28, 2006, pp. 4916-4924, Polymer vol. 47, Iss. 14, University of Delaware, Newark, DE 19716, USA.
Ying, Wu Bin; et al., Toward a Detoxification Fabric Against Nerve Gas Agents: Guanidine-Functionalized Poly[2-(3-butenyl)-2-Oxazoline]/Nylon-6,6 Nanofibers, Department of Applied Chemical Engineering, Mar. 2017, pp. 15246-15254, RSC Advances vol. 7, Iss. 25, College of Engineering, Chungnam National University, Daejeon 305-764, Korea.

* cited by examiner

*Primary Examiner* — Ana L. Woodward
(74) *Attorney, Agent, or Firm* — Woods Oviatt Gilman LLP; Dennis B. Danella, Esq.

(57) ABSTRACT

A method of preparing an acid neutralizing polymer powder (ANPP) includes preparing a first reaction product by contacting and reacting virgin polyamide powder material with tert-butoxide in a first aliquot of a polar aprotic solvent and preparing a mixture of an halogenated dialkylalkylamine to a second aliquot of the polar aprotic solvent. ANPP is prepared by mixing the first reaction product and the mixture for a period of time and at a temperature sufficient to produce the ANPP.

18 Claims, No Drawings

ACID NEUTRALIZING POLYMER POWDER

CROSS-REFERENCE TO RELATED APPLICATIONS

This application is a continuation-in-part application of U.S. patent application Ser. No. 16/376,669, filed Apr. 5, 2019, which claims the benefit of U.S. patent application Ser. No. 62/653,788, filed on Apr. 6, 2018, the contents of which are hereby incorporated by reference in their entirety. This application further takes the benefit of U.S. patent application Ser. No. 63/079,186, filed on Sep. 16, 2020, the contents of which are hereby incorporated by reference in their entirety.

TECHNICAL FIELD

The present invention relates to protective fabrics, and more particularly to protective fabrics for use in acid applications, and even more particularly to a protective fabric comprising amine functionalized nylon and the method of making such a fabric. In a further aspect, the present invention relates to amine functionalized nylon powder materials, as well as fabrics which incorporate the amine functionalized nylon powder material. In still another aspect of the present invention, an acid neutralizing polymer powder (ANPP) may be used as a component in a myriad of coatings as a filler, pigment or resin.

BACKGROUND OF THE INVENTION

Polyamides, including nylon 6, nylon 6,6 (nylon 66) and nylon 12, are synthetic polymers amenable to functionalization through chemical modification of the amide groups within the polymer backbone. Nylon fabrics have been modified to increase their tensile strength for military application or modified to improve dye acceptance. However, to date, nylon materials have not been modified to carry a basic pendant group, such as an amine, for use in acid protection fabrics. Additionally, nylon powders have also not been modified to carry a basic pendant group. Nor have basic nylon powders been incorporated within manufactured fabrics.

The present invention addresses these, as well as other, needs by providing a functionalized nylon powder that can be used, such as but not limited to, as a component in a myriad of coatings as a filler, pigment or resin, and may be used in the manufacture of personal protective equipment (PPE), as well as may be combined with other polymers such as PVC, polyurethane, and acrylic to further improve chemical resistance while also adding acid neutralization capabilities to end products.

SUMMARY OF THE INVENTION

In accordance with an aspect of the present invention, a method of preparing an acid neutralizing polyamide powder (ANPP) comprises preparing a first reaction product by contacting and reacting virgin polyamide powder material with tert-butoxide in a first aliquot of a polar aprotic solvent, preparing a mixture of a halogenated dialkylalkylamine and a second aliquot of the polar aprotic solvent, wherein the ANPP is prepared by mixing the first reaction product and the mixture. The preparation of each of the first reaction product and the ANPP is for a respective period of time and at a respective temperature sufficient to produce the first reaction product and the ANPP, respectively.

In a further aspect of the present invention, the virgin polyamide fabric material comprises nylon 6, nylon 66 or nylon 12, the polar aprotic solvent is either dimethyl sulfoxide (DMSO) or dimethylformamide (DMF) and the halogenated dialkylalkylamine has a general chemical formula of $R_2$—N—$R'$—X, where R is an alkyl containing 1-3 carbon atoms, $R'$ is an alkyl containing 1-12 carbon atoms and X is either chlorine or bromine. In accordance with an aspect of the present invention, R is either a methyl or ethyl group and $R'$ is an unbranched alkyl, and more preferably an unbranched ethyl, propyl or butyl group. In specific embodiments, the halogenated dialkylalkylamine is 2-chloro-N,N-dimethylethylamine.

In a further aspect of the present invention, the first reaction product is prepared under stirring at room temperature for at least 1 hour, the mixture is prepared under stirring at room temperature for at least 1 hour, and the ANPP is prepared under stirring at room temperature for at least 3 hours.

DETAILED DESCRIPTION

Polyamides, such as but not limited to nylon 6, nylon 66 and nylon 12 may be modified through basic attack of the amide hydrogen to generate a reactive nitrogen atom within the polyamide backbone. In accordance with an aspect of the present invention, the nitrogen reacts with a basic compound, such as an amine, to bond a basic pendant group to the polyamide chain. This basic pendant group is then free to neutralize any hydrogen ions which come into contact with modified nylon.

As will be seen more specifically in the examples below, virgin nylon 6 or nylon 66 fabric is first treated with tert-butoxide (potassium tert-butoxide or t-BuOK) in a polar aprotic solvent, such as but not limited to dimethyl sulfoxide (DMSO) or dimethylformamide (DMF). Without being bound to any particular theory, it is believed that the strongly basic t-BuOK extracts the amide hydrogen to activate the amide nitrogen. In a subsequent reaction, the activated nitrogen reacts with an amine, such as but not limited to a halogenated dialkylalkylamine including 2-chloro-dimethylehtylamine hydrochloride, to functionalize the nylon fabric. In accordance with an aspect of the present invention, the nylon fabric must be virgin, i.e., free from any post polymerization treatments such as dyeing, which may introduce reactive groups which may interfere with the above described reactions.

In another aspect of the present invention, the virgin nylon fabric may be of any desired thickness. By way of example and without limitation thereto, the nylon fabric may have a thickness of about 1 μm to about 500 μm, and more preferably of about 5 μm to about 50 μm, and still more particularly of about 5 μm to about 20 μm.

In a further aspect of the present invention, the modified nylon fabric may be regenerated following exposure to, and neutralization of, an acid. That is, the basic amine covalently bonded to the polyamide backbone may reversibly react with a hydrogen ion. Thus, should the modified nylon fabric encounter and neutralize an acid solution, the fabric may be generated such as through a buffer wash. One non-limiting example of a suitable buffer wash includes a sodium bicarbonate solution.

By way of example, laboratory gear, such as a laboratory coat for chemists, may be constructed of an embodiment of the modified nylon fabric in accordance with the present invention. Should the chemist splash or otherwise expose the coat to an acid, the modified nylon fabric will neutralize the acid before the chemist suffers an acid burn or damages his or her underlying clothing. The coat may then be washed in a bicarbonate solution to regenerate the basic amine bonded to the amide nitrogen.

In another non-limiting example, the modified nylon fabric in accordance with the present invention may be used to form at least a portion of a diaper to neutralize acid that may be contained within human excretions to reduce the possibility of skin rashes developing from prolonged contact of such acidic material with the skin. Similarly, in a further example, the modified nylon fabric in accordance with the present invention may be used to form a portion of a pair of gloves, particularly the fingers and palm portions of the gloves that are most likely to come into contact with acidic materials.

EXAMPLES

Experiment 1

Materials and Method

1. Cut 1.5×1.5 cm 5 µm thick Nylon 6,6 sample
2. Dry Nylon 6,6 sample in oven for 3 hrs
3. Dry (1) 50 ml Erlenmeyer flask (Flask 1) and (1) 250 ml Erlenmeyer flask (Flask 2) in oven for 3 hrs
4. Charge Flask 1 with 10 ml DMSO
5. Add 1 mmol 2-chloro-N, N-dimethylethylamine to Flask 1
6. Loosely cap and stir Flask 1 for 2 hrs
7. Charge Flask 2 with 20 ml DMSO
8. Add 2 mmol t-BuOK and Nylon 6,6 sample to Flask 2
9. Loosely cap and stir Flask 2 for 1 hr
10. Add contents from Flask 1 to contents of Flask 2
11. Stir Flask 2 for 1 hr
12. Allow Flask 2 to sit for 12 hours
13. Remove Nylon 6,6 sample
14. Wash with DMSO, THF, Water
15. Let dry for 24 hrs The weight of the nylon 6, 6 sample (Sample 1) increased from 0.01 g to 0.015 g. In addition, the nylon fiber became discolored obtaining brown or yellow tint to it and changed textures to be rougher than the unreacted virgin nylon 6, 6 sample. Most of the discoloration is cleared following the DMSO wash. When added to a pH 2.51 HCl solution, pH rose to 2.53. Following a sodium bicarbonate wash (1 g $NaHCO_3$ in 50 ml water) and sonication, addition of three swatches of Sample 1 nylon swatches to dilute HCl solution increased pH from 3.98 to 4.52.

Experiment 2

Materials and Method

1. Dry 0.82 g 5 µm thick Nylon 6,6 sample in oven for 3 hrs
2. Dry (1) 250 ml Erlenmeyer flask (Flask 1) and (1) 1000 ml Erlenmeyer flask (Flask 2) in oven for 3 hrs
3. Charge Flask 1 with 11.808 g 2-chloro-N, N-dimethylethylamine hydrochloride
4. Add 150 ml DMSO to Flask 1
5. Loosely cap and stir Flask 1 for 2 hrs
6. Charge Flask 2 with 18.4 g t-BuOK and Nylon 6,6 sample
7. Add 250 ml DMSO to Flask 2
8. Loosely cap and stir Flask 2 for 1 hr
9. Add contents from Flask 1 to contents of Flask 2
10. Loosely cap and stir Flask 2 for 12 hrs
11. Remove Nylon 6,6 sample
12. Wash with DMSO, THF, Water
13. Let dry for 24 hrs The weight of the nylon 6, 6 sample (Sample 2) decreased 0.2 g. In addition, the nylon fiber became discolored obtaining brown tint. When added to a pH 3.56 HCl solution, pH rose to 5.29.

Experiment 3

Materials and Method

1. Cut 1.5×1.5 cm 5 µm thick Nylon 6,6 sample
2. Dry Nylon 6,6 sample in oven for 1.5 hrs
3. Dry (1) 50 ml Erlenmeyer flask (Flask 1) and (1) 250 ml Erlenmeyer flask (Flask 2) in oven for 1.5 hrs
4. Charge Flask 1 with 0.3 g 2-chloro-N, N-dimethylethylamine hydrochloride
5. Add 20 ml DMSO to Flask 1
6. Loosely cap and stir Flask 1 for 2 hrs
7. Charge Flask 2 with 0.45 g t-BuOK and Nylon 6,6 sample
8. Add 30 ml DMF to Flask 2
9. Loosely cap and stir Flask 2 for 1 hr
10. Add contents from Flask 1 to contents of Flask 2
11. Loosely cap and stir Flask 2 for 12 hrs
12. Remove Nylon 6,6 sample
13. Wash with DMF, THF, Water
14. Let dry for 1.5 hrs The weight of the nylon 6, 6 sample (Sample 3) increased 100%. In addition, there was little change in color and texture of the nylon fiber. When added to a pH 3.30 HCl solution, pH rose to 3.68. Following a sodium bicarbonate wash (1 g $NaHCO_3$ in 50 ml water) and sonication, addition of a single Sample 3 nylon swatch to dilute HCl solution increased pH from 2.98 to 3.43.

Experiment 4

Materials and Method

1. Dry 0.86 g 5 µm thick Nylon 6,6 sample in oven for 3 hrs
2. Dry (1) 250 ml Erlenmeyer flask (Flask 1) and (1) 1000 ml Erlenmeyer flask (Flask 2) in oven for 3 hrs
3. Charge Flask 1 with 12.5 g 2-chloro-N, N-dimethylethylamine hydrochloride
4. Add 150 ml DMSO to Flask 1
5. Loosely cap and stir Flask 1 for 2 hrs
6. Charge Flask 2 with 19.5 g t-BuOK and Nylon 6,6 sample
7. Add 300 ml DMF to Flask 2
8. Loosely cap and stir Flask 2 for 1 hr
9. Add contents from Flask 1 to contents of Flask 2
10. Loosely cap and stir Flask 2 for 12 hrs
11. Remove Nylon 6,6 sample
12. Wash with DMF, THF, Water
13. Let dry for 1.5 hrs Little change in color and texture of the nylon fiber was noted. When added to a pH 2.85 HCl solution, pH rose to 5.68.

From the above examples, it should be noted that each of the reactions may take place at room temperature, defined as between 20-24° C. Additionally, each reaction may also occur at ambient pressure, and in one aspect of the present invention, each reaction should avoid high pressure conditions, i.e., greater than about 100 torr (0.133 bar) above ambient pressure.

While the above description and examples have described nylon fabric as a starting reagent, in a further aspect of the invention, nylon powder, such as but not limited to nylon 6, nylon 66 or nylon 12, may be used as a starting reagent in place of the nylon fabric. In accordance with this aspect of the invention, the nylon powder may have a mean particle size of about 50 micron to about 1,000 micron, and more particularly, between about 50 micron and 500 micron, and still more particularly between about 100 micron and 200 micron. It has been found that the nylon powder has increased modification to include more amino groups when compared to the corresponding nylon fabric. Without being tied to any particular theory, it is believe that the surface area of the powder is greater than that of the fabric, thereby increasing the density of amino groups and resultant neutralization reactivity when exposed to an acidic environment. Smaller diameter nylon powder material also increases the relative surface area available for amino group modification.

In accordance with this further aspect of the invention, the acid neutralizing polymer powder (ANPP) may then be used as a component in a myriad of coatings as a filler, pigment or resin. In one example, the ANPP may conform to the manufacture of current personal protective equipment (PPE), as well as may be combined with other polymers such as PVC, polyurethane, and acrylic to further improve chemical resistance while also adding acid neutralization capabilities.

Examples

Experiment 5

Materials and Method

1. Place the 125 ml and 250 ml Erlenmeyer flask in the drying oven
2. Charge dried 125 ml flask with 0.6 g N, N dimethylethylamine.
3. Add 50 ml dimethylformamide (DMF) and stir for 2 hours.
4. Charge 250 ml flask with 1 g nylon powder and 1 g potassium tert-butoxide.
5. Add 50 ml DMF and loosely cap the flask.
6. Sonicate at 50° C. for 1 hr.
7. Add contents of 125 ml flask to 250 ml flask.
8. Return 250 ml flask to sonicator and sonicate at 50° C. for 3 hrs.
9. Vacuum filter contents of 250 ml flask.
10. Dry and weigh resultant ANPP powder material.

It should be noted that Experiment 5 may also be conducted using phenol solvents in place of the DMF.

Experiment 6

Materials and Method

1. Charge beaker with hydrochloric acid (HCl) solution.
2. Measure pH of HCl solution.
3. Add dried and weighed ANPP powder material from Experiment 5 to beaker and stir for 30 seconds.
4. Record pH of ANPP-reacted HCl solution.
5. Optionally, vacuum filter ANPP-reacted HCl solution and dry and weigh contents.

It has been found that a pH 1.0 HCl solution may be raised to pH 1.96.

Experiment 7

Materials and Method

1. Charge dried 2 L Erlenmeyer flask (flask 1) with 320 g 2-chloro-N, N-dimethylethylamine hydrochloride.
2. Add 1.5 L dimethylformamide (DMF) to flask 1 and stir for 1 hour.
3. Charge 5 L beaker (beaker 1) with 500 g nylon powder and 500 g potassium tert-butoxide.
4. Add 2 L DMF to beaker 1 and stir for 1 hour.
5. Add contents of flask 1 to beaker 1 stir for 3 hours.
6. Vacuum filter contents of beaker 1.
7. Dry and weigh resultant ANPP powder material.

When conducting Experiment 7, it should be noted that step 5 is an exothermic reaction and care should be taken to ensure that the reaction temperature does not exceed approximately 120° C. During step 5, all contents of flask 1 may be added to beaker 1 as a single addition or may be added as sequential additions over 10-15 minutes. It should be further noted that the filter contents (ANPP powder material) may be optionally washed with water prior to drying and weighing of the material. The final ANPP powder material appears brown to light brown in color.

It has been found that a functionalized nylon powder produced in accordance with Experiment 7 may raise a pH 1.0 HCl solution to pH 6.0.

Although the invention has been described with reference to preferred embodiments thereof, it is understood that various modifications may be made thereto without departing from the full spirit and scope of the invention as defined by the claims which follow.

What is claimed is:

1. A method of preparing an acid neutralizing polyamide powder (ANPP), comprising:
   a) preparing a first reaction product by contacting and reacting a virgin polyamide powder material with tert-butoxide in a first aliquot of a polar aprotic solvent;
   b) preparing a mixture of a halogenated dialkylalkylamine having a general chemical formula of $R_2N-R'-X$ and a second aliquot of the polar aprotic solvent, wherein R is an alkyl containing 1-3 carbon atoms, wherein R' is an alkyl containing 1-12 carbon atoms, wherein X is either chlorine or bromine, and wherein R is not the same as R'; and
   c) preparing the ANPP by mixing the first reaction product and the mixture,
   wherein each of steps a) and c) is for a respective period of time and at a respective temperature sufficient to produce the first reaction product and the ANPP.

2. The method of claim 1 wherein the virgin polyamide powder material comprises nylon 6, nylon 66 or nylon 12.

3. The method of claim 1 wherein the polar aprotic solvent is either dimethyl sulfoxide (DMSO) or dimethylformamide (DMF).

4. The method of claim 1 wherein R is either a methyl or ethyl group and R' is an unbranched alkyl selected from the group consisting of an ethyl, propyl or butyl group.

5. The method of claim 1 wherein the halogenated dialkylalkylamine is 2-chloro-N, N-dimethylethylamine.

6. The method of claim 1 wherein the first reaction product is prepared under stirring at room temperature for at least 1 hour.

7. The method of claim 1 wherein the mixture of step b) is prepared under stirring at room temperature for at least 1 hour.

8. The method of claim 1 wherein the ANPP of step c) is prepared under stirring at room temperature for at least 3 hours.

9. The method of claim 1 further comprising the step of:
d) following the preparation step c), washing the ANPP with water.

10. An acid neutralizing polyamide powder (ANPP) produced according to a method comprising:
a) preparing a first reaction product by contacting and reacting a virgin polyamide powder material with tert-butoxide in a first aliquot of a polar aprotic solvent;
b) preparing a mixture of a halogenated dialkylalkylamine having a general chemical formula of $R_2N$—$R'$—$X$ and a second aliquot of the polar aprotic solvent, wherein R is an alkyl containing 1-3 carbon atoms, wherein R' is an alkyl containing 1-12 carbon atoms, wherein X is either chlorine or bromine, and wherein R is not the same as R'; and
c) preparing the ANPP by mixing the first reaction product and the mixture,
wherein each of steps a) and c) is for a respective period of time and at a respective temperature sufficient to produce the first reaction product and the ANPP.

11. The acid neutralizing polymer material of claim 10 wherein the virgin polyamide powder material creates a polyamide backbone comprising nylon 6, nylon 66 or nylon 12.

12. An acid neutralizing polymer material comprising a polyamide backbone and a plurality of dimethylalkylamine pendant groups covalently bonded to the polyamide backbone.

13. The acid neutralizing polymer material of claim 12 wherein each of the plurality of dimethylalkylamine pendant groups is a reaction product between 2-chloro-N,N-dimethylethylamine and an amide anion on the polyamide backbone.

14. The acid neutralizing polymer material of claim 12 wherein the polyamide backbone comprises nylon 6, nylon 66 or nylon 12.

15. The acid neutralizing polymer material of claim 12 wherein each of the plurality of dialkylalkylamine pendant groups is a reaction product between 2-chloro-N,N-dimethylethylamine and an amide anion on the polyamide backbone.

16. An acid neutralizing polymer material comprising a polyamide backbone and a plurality of dialkylalkylamine pendant groups having a general chemical formula of $R_2N$—$R'$—$X$ covalently bonded to the polyamide backbone, wherein R is an alkyl containing 1-3 carbon atoms, wherein R' is an alkyl containing 1-12 carbon atoms, and wherein R is not the same as R'.

17. The acid neutralizing polymer material of claim 16 wherein the polyamide backbone comprises nylon 6, nylon 66 or nylon 12.

18. The acid neutralizing polymer material of claim 16 wherein each of the plurality dialkylalkylamine pendant groups is a reaction product between 2-chloro-N,N-dimethylethylamine and an amide anion on the polyamide backbone.

* * * * *